United States Patent Office 3,547,800
Patented Dec. 15, 1970

3,547,800
APPARATUS AND METHOD FOR PURIFYING WASTE WATERS
Pei Tai Pan, Beloit, Wis., assignor to Fairbanks Morse Inc., New York, N.Y., a corporation of Delaware
Filed May 29, 1967, Ser. No. 641,873
Int. Cl. B01k 3/00; C22d 1/02
U.S. Cl. 204—269                                11 Claims

ABSTRACT OF THE DISCLOSURE

An apparatus for separating the solid and liquid fractions of a sewage mixture and for treating the sewage in a manner permitting disposal of the treated fractions. In one embodiment, an electrolytic cell is used to produce coagulating, flotation and disinfecting elements. The sewage is initially brought into contact with these elements in a mixing or coagulating cell. The solid fraction thereof is then separated in a flotation cell while the liquid fraction or effluent is disinfected in a chlorination chamber from which the treated effluent is discharged and disposed of. In modifications of this system, the mixing or coagulating cell and the flotation chamber can be combined; a chlorinator apparatus can be located between the electrolytic cell and the chlorination chamber or other chlorine generating means can be used to produce a disinfectant, and the number and spacing of electrodes in the cells or chambers can be arranged to reduce voltage drop through low conductivity solution.

---

This invention relates to a method and apparatus for purifying liquids and more particularly to a process for separating solids from liquids and for purifying the resulting effluent. The invention is directed to, but not limited to, the purification of waste waters, such as sewage liquids and the like.

The invention is primarily concerned with a sewage treatment system for marine vessels for use in ports characterized by waters of varying salinity. One embodiment of the present system utilizes an electrolytic cell for generation of sodium hydroxide for coagulation of solid particles in a flotation cell and for generation of nascent chlorine to effect germicidal action on the flotation cell effluent. In fresh water harbors, or harbors having brackish water, the operation of the electrolytic cell may be augmented by the use of a salination chamber. Also, it is contemplated that the intake in salt water harbors be passed through an ion exchange unit for removal of calcium and magnesium ions.

According to the process of the present invention, entrainment of solid particles in the waste water is efficiently carried out by coagulation of particles by the electrolytic generation of sodium hydroxide and by germicidal chlorination of the effluent resulting from coagulation. Chlorine can be produced by the electrolytic cell, augmented from a separate source, or produced by a separate source.

A primary object of the invention is to provide apparatus for purifying waste liquids, such as sewage liquids and the like in which the liquid portion may be either sea, brackish or fresh water, in which either sea, brackish or salted fresh water may be utilized in an electrolytic cell of the type having a permselective or other type of membrane whereby sodium hydroxide and nascent chlorine are produced, and whereby the sodium hydroxide is used to coagulate the solid particles in the waste liquid and the chlorine utilized as a germicidal agent.

A further object of the invention is to provide apparatus and devise a method whereby sewage on marine vessels may be efficiently and effectively treated so that the effluent discharged therefrom will not contaminate harbors.

Another object of the invention is to provide apparatus and devise a method for treating sewage on a marine vessel regardless of whether the ship is in a salt water harbor and thus pumping sea water through the flushing system or is in a harbor where the intake water is either fresh or brackish.

Figure 1:
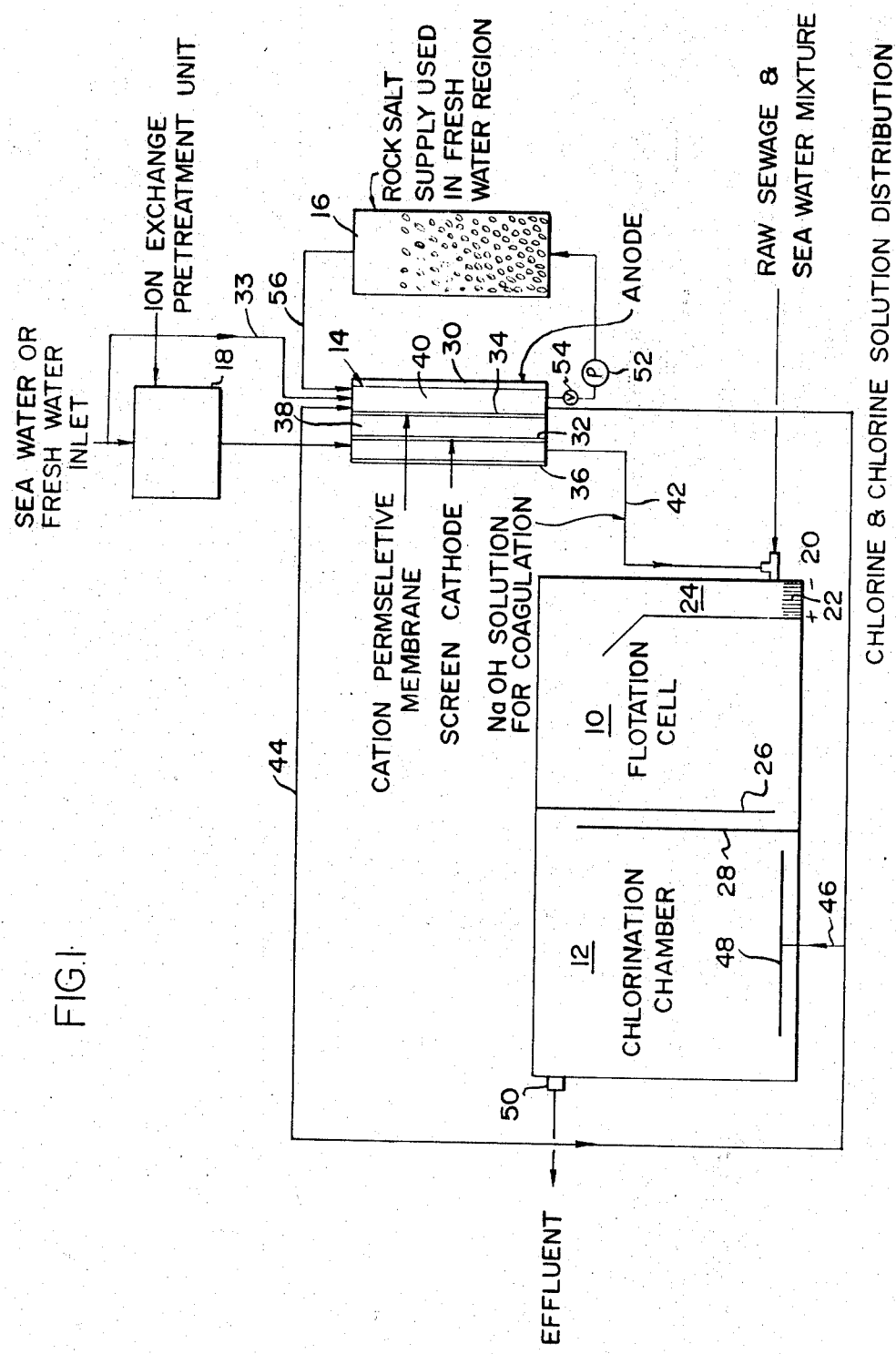
Figure 2:
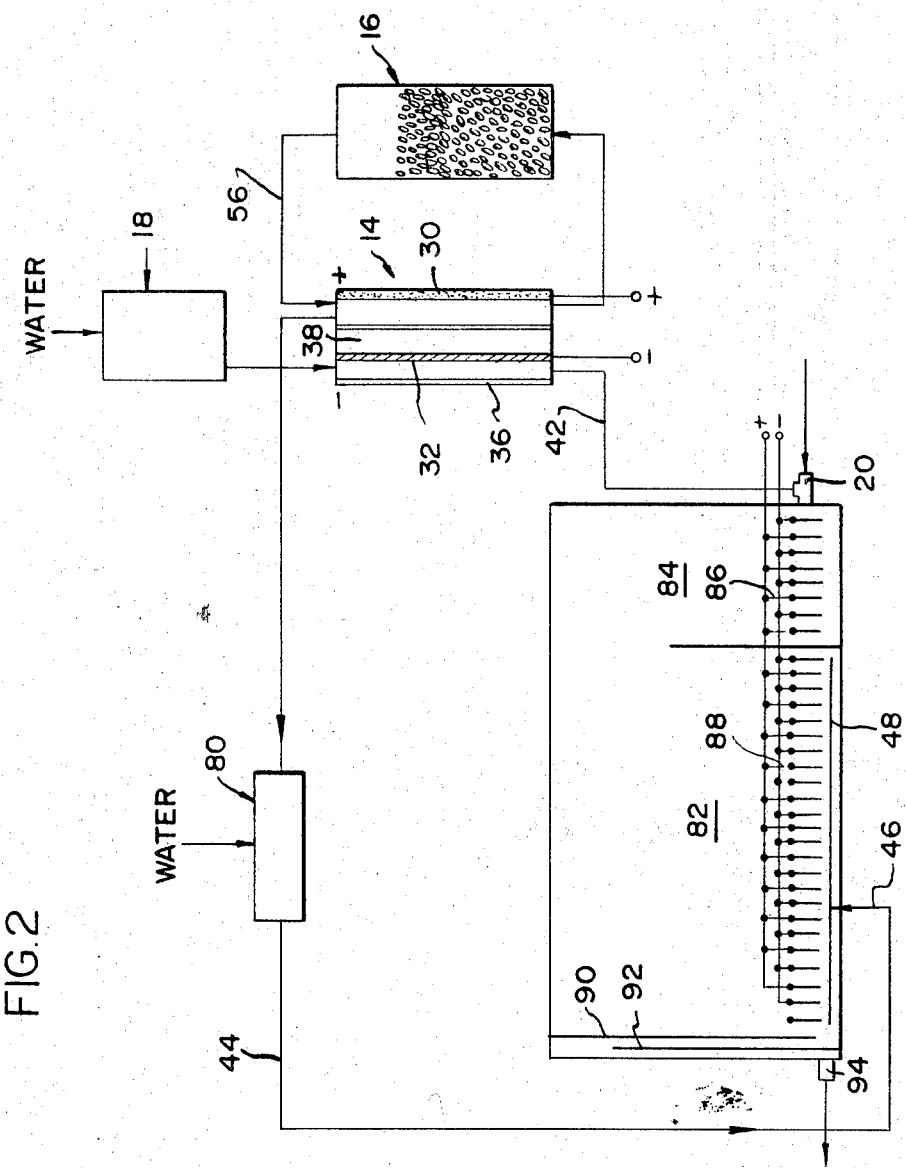

These and other objects of the invention will be apparent as the description proceeds with reference to the attached drawing, wherein:

FIG. 1 is a diagrammatic view of the apparatus used for carrying out the present invention; and
FIG. 2 is a modification of the embodiment of FIG. 1.

Referring now to FIG. 1, the apparatus thereof includes a flotation cell 10, a chlorination chamber 12, an electrolytic unit 14, a salination chamber 16 and an ion exchange pretreatment unit 18.

Raw sewage suspended in either sea water or fresh water is introduced into the flotation cell 10 by means of a T-connection 20 immediately above an electrode unit 22. A sodium hydroxide solution is mixed with the sewage feed for coagulation of the solid particles for more efficient entrainment of the solid particles in a plurality of gas bubbles rising from the electrode unit 22. The gas bubbles rise within a subchamber 24 and carry the entrained particles to the surface where they are removed by any suitable means, such as that described and illustrated in applicant's above mentioned co-pending application. Liquid effluent from the flotation cell 10 passes between baffles 26 and 28 into the chlorination chamber 12.

Sodium hydroxide for the cell 10 is produced in the electrolytic unit 14, as is nascent chlorine for treatment of the effluent in the chlorination chamber 12. To this end, the electrolytic unit 14 includes an anode 30, which may be of graphite, platinum, platinum and rhodium-plated on titanium or other suitable anode material. A cathode 32 is disposed within the unit 14 in spaced relation to the anode 30 and may be made of perforated stainless steel, nickel or monel plate or a woven fabric of these or other suitable cathode materials. Interposed between the anode 30 and the cathode 32 is a cation permselective membrane 34. A suitable membrane is one of the "Series 300" membranes sold under that trade name by American Machine & Foundry Company, Springdale, Conn. The unit 14 is illustrated as having a wall 36 cooperating with the membrane 34 to form a cathode chamber indicated by reference numeral 38. In like manner, the anode 30 cooperates with the membrane 34 to form an anode chamber 40.

In normal operation of the present apparatus while the vessel is in a salt water harbor, sea water is introduced into the cathode chamber 38 through the ion exchange pretreatment unit 18, which may be any of the common ion exchange devices, for removal of calcium and magnesium ions which would otherwise tend to form scale on the cathode 32. At the same time, untreated sea water is introduced into the anode chamber 40 through conduit 33. The salt in the sea water dissociates in the anode chamber 40 thus forming sodium and chloride ions. The sodium ions pass through the membrane 34 deposit on cathode to combine with the hydroxy ions resulting from the dissociation of water, to form sodium hydroxide solution which is fed to the T-connection 20 by means of conduit 42. The chloride ions flow to the anode 30 and combine there to produce nascent chloride gas. This nascent chlorine is fed to the chlorination chamber 12 by means of conduit 44, conduit 46 and distribution ring 48 where it exerts a germicidal action. Effluent treated in the chlorination chamber 12 may be discharged overboard through exit port 50 without contamination of the harbor water.

Where the intake water is sea water, the sewage liquid contains calcium and magnesium ions and as a result colloidal solid particles are coagulated because of precipitation at the high pH range. The gas bubbles produced by electrolysis in the flotation cell lift the suspended finely divided particles to the surface for removal in any convenient manner.

In the event that the vessel is in a harbor having fresh or brackish water, the requisite salination of the electrolysis unit 14 can be carried out by the salination cell 16 in which rock salt may be packed. Fresh water from the anode chamber 40 is pumped through the cell 16 by means of a pump 52 upon opening of a valve 54 so that the water flows upwardly through the rock salt and is returned to the chamber 40 in the form of a saline solution by means of a conduit 56.

The present invention exhibits important advantages over prior art systems. For instance, scale formation at the cathode is minimized and thus maintenance costs are reduced by the removal of calcium and magnesium ions in the ion exchange pretreatment unit. In the present system, only a small portion of the total water passes through the electrolytic cell and thus ion exchange costs are minimized. Scale forming on the flotation cell electrodes can be eliminated merely by periodically reversing the polarity of the electrodes. In this manner, scale formed during the cathode cycle dissolves or peels off during the anode cycle. Total power costs are minimized because full strength sea water can be used in the cathode chamber and the spacing of the flotation cell electrodes can be substantially reduced, thus reducing the voltage drop through low conductivity solutions.

As contrasted with prior art systems, the present system may be used where sea water is not available and, since only a small portion of the total water must be salinized, a minimum amount of rock salt may be used. Furthermore, the present system distinguishes from prior art systems in that the water in which the finely divided solids are suspended may be fresh or saline. While the above described system contemplates manual selection for sea water or fresh water intake, it will be apparent that the actuation of the salination cell 16 may be rendered entirely automatic depending upon the conductivity of the intake water. For example, the pump 52 may be actuated and the valve 54 opened when the salinity of the intake water drops to a predetermined level.

The modified embodiment of the apparatus of the invention, as shown in FIG. 2, is similar to that of FIG. 1 and like reference numerals are used to denote like features. However, in this latter system, a chlorinator 80 is connected in conduit 44 between anode 30 of electrolytic unit 14 and the chlorination chamber 82. Water is added to the chlorinator 80 through a suitable conduit to combine with the nascent chlorine gas produced at the anode of the electrolytic unit. This produces a solution of hydrochloric acid which is introduced into the bottom of the chlorination chamber.

Sodium hydroxide produced at the cathode 32 of the electrolytic unit is transported through conduit 42 to raw sewage T-connection and inlet 20. The sodium hydroxide is permitted at this point to mix with raw sewage and the carrier liquid in a combined flotation-mixing or coagulating chamber 84. It cooperates with calcium and magnesium ions in the carrier liquid to produce colloidal solid or coagulated sewage which is readily carried to the surface of the carrier liquid. At the surface, a skimming apparatus, such as is disclosed in applicant's co-pending application Ser. No. 465,215, filed June 18, 1965, entitled "Electrolytic Flotation Method," and which forms no part of the present invention can be used. Electrodes 86 placed in the base portion of flotation-mixing chamber 84 facilitate the coagulation process.

The effluent remaining after coagulation passes into the chlorination chamber which is also equipped with relatively closely spaced electrodes 88 to aid in the electrolytic treatment of liquid and solid waste matter. As was the case with the FIG. 1 embodiment, chlorine is introduced in chlorination chamber 82 through conduit 46 and a diffuser 48 which is designed to produce a more even distribution of the chlorine germicide throughout the liquid in the chlorination chamber. Chlorine can be generated by other means for disinfecting the effluent in the chlorination chamber.

Following treatment, the effluent liquid is transmitted through passages provided by baffles 90 and 92 and out of the system through effluent discharge opening 94 located near the bottom of the chlorination chamber. The circuitous liquid flow path provided by baffles 90 and 92 is designed to minimize solid matter carry-over into the effluent discharge 94.

The system of the invention, therefore, can be used with salt, brackish or fresh water as the carrier liquid. They can function economically and efficiently in each of these environments to reduce waste matter to safely discardable components.

Various modes of carrying out the invention are contemplated as being within the scope of the following claims particularly pointing out and distinctly claiming the subject matter which is regarded as the invention.

I claim:

1. Apparatus for simultaneously separating suspended and dissolved solids in a raw sewage mixture from the liquid fraction therefor and treating the separated liquid effluent comprising a flotation chamber having an inlet for introducing raw sewage therein and an outlet for liquid effluent, electrolytic coagulation and disinfection means for producing coagulation of said solids and disinfection of the liquid effluent, and electrolytic flotation means in said chamber for buoying the coagulated solid particles to the surface of said flotation chamber.

2. The apparatus of claim 1 wherein said electrolytic coagulation means includes a source of saline solution thereby to produce caustic soda upon electrolysis to contact and coagulate the suspended and dissolved solid particles in the raw sewage mixture.

3. The apparatus of claim 1 wherein said electrolytic flotation means comprises electrodes disposed in soid flotation chamber immediately below said inlet port for generating a plurality of gas bubbles for attachment to and buoying finely divided solid particles to the surface of said chamber.

4. The apparatus of claim 1 wherein said electrolytic coagulation and disinfection means includes a source of saline solution thereby to produce nascent chlorine upon electrolysis for contacting and disinfecting the liquid effluent.

5. Apparatus for separating suspended and dissolved solids in a raw sewage mixture from the liquid fraction therefor and treating the separated liquid effluent comprising a first chamber having a raw sewage inlet, electrolytic coagulation means disposed in communication with said first chamber through said inlet to provide a coagulating agent for coagulating the suspended and dissolved solids in the raw sewage mixture, electrolytic flotation means disposed in said first chamber for buoying the coagulated solid particles to the surface of said first chamber, a second chamber disposed in fluid communication with said first chamber, electrolytic disinfecting means disposed in fluid communication with said second chamber to provide a disinfecting agent for disinfecting the liquid effluent as the effluent flows from said first chamber to said second chamber.

6. The apparatus of claim 5 wherein said electrolytic coagulation means comprises the cathode chamber of an electrolytic cell for generating a coagulating agent.

7. The apparatus of claim 6 wherein said electrolytic disinfecting means comprises the anode chamber of said electrolytic cell for generating a disinfecting agent.

8. The apparatus of claim 7 wherein a salination cell is provided in fluid communication with said electrolytic cell, for containing a supply of salt, whereby fresh water may be circulated from the anode chamber of said electrolytic cell through said salination cell and the resulting saline solution returned to said electrolytic cell in order to generate sodium hydroxide and nascent chlorine.

9. The apparatus of claim 5 wherein the electrolytic coagulation and disinfecting means comprises an electrolytic cell having a source of sea water which upon introduction into said electrolytic cell diassociates forming sodium ions which travel to the cathode and combine with hydroxal ions to form sodium hydroxide, and chlorine ions which travel to the anode and combine to form nascent chlorine.

10. The apparatus of claim 9 wherein an ion exchange pretreatment unit is provided for pretreating the sea water prior to its introduction into said electrolytic cell in order to remove calcium and magnesium ions from the sea water.

11. The apparatus of claim 5, wherein said electrolytic flotation means comprises a series of electrodes disposed immediately below said inlet for generating bas bubbles in order to buoy the coagulated solid particles to the surface of said first chamber.

References Cited

UNITED STATES PATENTS

| | | | |
|---|---|---|---|
| 669,439 | 3/1901 | Frasch | 204—257XR |
| 1,069,169 | 8/1913 | Parker | 210—44XR |
| 1,194,000 | 8/1916 | Dobyns & Elderkin, Jr. | 204—149XR |
| 1,344,127 | 6/1920 | Greenawalt | 204—108 |
| 2,456,897 | 12/1948 | Smiley | 204—232 |
| 2,997,430 | 8/1961 | Foyn | 204—151 |
| 3,035,992 | 5/1962 | Hougen | 204—149 |
| 3,220,941 | 11/1965 | Osborne | 204—87 |
| 3,255,097 | 6/1966 | Williams | 204—143 |
| 3,347,786 | 10/1967 | Baer et al. | 210—45 |
| 3,431,187 | 3/1969 | Lancy | 204—109 |

HOWARD S. WILLIAMS, Primary Examiner

A. C. PRESCOTT, Assistant Examiner

U.S. Cl. X.R.

204—149; 210—13, 44

UNITED STATES PATENT OFFICE
CERTIFICATE OF CORRECTION

Patent No. 3,547,800            Dated December 15, 1970

Inventor(s) Pei Tai Pan

It is certified that error appears in the above-identified patent and that said Letters Patent are hereby corrected as shown below:

Column 4, line 44, "soid" should read -- said --. Column line 25, "bas" should read -- gas --.

Signed and sealed this 25th day of July 1972.

(SEAL)
Attest:

EDWARD M. FLETCHER, JR.                ROBERT GOTTSCHALK
Attesting Officer                      Commissioner of Paten